United States Patent [19]

Svensson

[11] Patent Number: 5,093,485

[45] Date of Patent: Mar. 3, 1992

[54] POLYSACCHARIDE-BASED COMPOSITION AND ITS USE

[75] Inventor: Sigfrid Svensson, Furulund, Sweden

[73] Assignee: Polysaccharide Industries Aktiebolag Psi, Malmö, Sweden

[21] Appl. No.: 438,446

[22] PCT Filed: Jun. 14, 1988

[86] PCT No.: PCT/SE88/00321

§ 371 Date: Dec. 29, 1989

§ 102(e) Date: Dec. 29, 1989

[87] PCT Pub. No.: WO88/10284

PCT Pub. Date: Dec. 29, 1988

[30] Foreign Application Priority Data

Jun. 17, 1987 [SE] Sweden .............................. 87025359

[51] Int. Cl.$^5$ .......................... C08L 3/00; C08L 5/00; B05D 5/00

[52] U.S. Cl. ...................... 536/1.1; 536/4.1; 536/20; 536/90; 536/91; 428/411.1; 428/532; 523/149

[58] Field of Search ............ 536/1.1, 4.1, 20, 90, 536/91, 114; 428/411.1, 532; 523/149

[56] References Cited

U.S. PATENT DOCUMENTS

| | | | |
|---|---|---|---|
| 2,811,456 | 10/1957 | Coleman et al. | 428/464 |
| 2,877,131 | 3/1959 | Overholt et al. | 427/5 |
| 3,765,918 | 10/1973 | Jordan et al. | 106/205 |
| 5,017,237 | 5/1991 | Svensson | 134/4 |

FOREIGN PATENT DOCUMENTS

| | | |
|---|---|---|
| 465313 | 5/1950 | Canada . |
| 471748 | 2/1951 | Canada . |
| 59-186668 | 10/1984 | Japan . |
| 60-55039 | 3/1985 | Japan . |
| 344453 | 3/1931 | United Kingdom . |

Primary Examiner—Nathan M. Nutter
Attorney, Agent, or Firm—Burns, Doane, Swecker & Mathis

[57] ABSTRACT

A polysaccharide-based composition, characterized by comprising or essentially consisting of:

at least a first component a) excluding galactane constituted by a substituted $\beta$-1,4-linked glycan which is dissolvable in water of a certain temperature and which has a molecular weight (Mw) of $\geq 5 \cdot 10^4$ Daltons, preferably $\geq 10^5$ Daltons, particularly $\geq 10^6$ Daltons, and at least a second component b), also excluding galactans, constituted by a substituted $\beta$-1,4-linked glycan which is more difficult to dissolve than said first component at said temperature, or is agar or a carrageenan;

the use of the composiiton above as a:
  a) means for reducing friction,
  b) means for facilitating removal of undesired contamination from surfaces, such as graffiti, scrawl, soot etc.,
  c) means for preserving moisture,
  d) protective surface coverage,
  e) packaging material,
  f) slow release matrix or coating for drugs;

a body in solid phase having a surface intended for contact with a liquid and for relative movement between surface and liquid, said surface being coated with a solid film essentially consisting of such a composition; and a method for the removal of undesired contamination on a surface.

35 Claims, 1 Drawing Sheet

POLYSACCHARIDE-BASED COMPOSITION AND ITS USE

The present invention relates to a polysaccharide-based composition, its several uses, a solid phase body covered by a film essentially consisting of such composition, and a method of removing undesired contamination on a surface.

Although the present invention originates from scientific research aiming at reducing the energy loss at relative movement, more specifically reducing the friction between a solid body and a liquid contacting such body, the invention is in fact applicable to a multitude of uses in addition to such friction-reducing means, which will be made clear in the following disclosure. However, at the outset, the invention will be somewhat outlined against the background of the problem of reducing the friction between a solid body and a liquid contacting such body at relative movement between body and liquid.

At relative movement between a solid body and a liquid, for example water, a layer of the liquid adheres to the solid body. This layer, the viscous boundary layer, has a thickness of 20 microns at laminar flow but can at turbulent flow reach a thickness of 1%–2% of the waterline length. In the viscous boundary layer the relative movement speed increases from zero to the actual speed. The surface friction develops and acts in the viscous boundary layer.

It is known since long that polymers dissolved in the liquid phase can reduce surface friction between liquid and solid body in concentrations from some ppm:s and more. Friction reductions of up to 80% have been measured at a polymer concentration of 200 ppm.

The experiments performed up to now are based on adding polymers to the mobile liquid phase, the polymer progressively entering by diffusion into the viscous boundary layer. Since the friction-reducing effect of the polymer acts in the viscous boundary layer the polymer concentration of said layer is decisive for the degree of reduction of the friction. In order to reduce surface friction on objects moving in water, experiments using different types of release, for example through nozzles, have shown that unrealistically large quantities of polymers have to be added in order that reduction of the friction shall be attained. This is not surprising since the polymers using this release technique at laminar flow will be added to the bypassing aqueous phase and thereby removed from the surface of the object and its viscous boundary layer.

One object of the present invention is to provide a technique for reducing the friction between a solid body and a liquid whereby the disadvantages of the known techniques are eliminated and a substantial reduction of the friction will be obtained. Thus, on the one hand, the invention aims at substantial reduction of the quality of polymer that has to be added and, on the other hand, while using a substantially reduced quantify of the polymer the invention provides for substantial reduction of the friction.

To attain this object of the present invention there is provided a polysaccharide-based composition comprising at least two components, one of which has a higher dissolvability in water at a certain temperature than the other one at the same temperature.

Another object of the invention is to provide techniques capable of facilitating removal of undesired contamination from surfaces, to provide means for preserving moisture, to provide for protective surface coverage, to provide packaging materials, and to provide means for obtaining slow release for drugs.

The invention also covers bodies in solid phase having a surface coated with a solid film essentially consisting of a composition as outlined above.

Finally, the invention also has for an object to provide a method for the removal of undesired contamination on a surface.

For these and other objects which will be clear from the following the present invention provides for a polysaccharide-based composition, said composition comprising or essentially consisting of:

at least a first component a) excluding galactans constituted by a substituted $\beta$-1,4 -linked galactan which is dissolvable in water of a certain temperature and which has a molecular weight (Mw) of $\geq 5 \cdot 10^4$ Daltons, preferably $\geq 10^5$ Daltons, particularly $\geq 10^6$ Daltons, and at least a second component b) also excluding galactans, constituted by a substituted $\beta$-1,4 -linked glycan which is more difficult to dissolve than said first component at said temperature, or is agar or a carrageenan.

In such composition it is preferred that component a) is a substituted $\beta$-1,4-linked glucan, glucomannan, xylan, mannan or a $\beta$1,4-linked polysaccharide consisting of 2-acetamido-2-deoxy-D-glucopyranos-or 2-amino-2-deoxy-D-glucopyranos entities. The substitution of the glycan of component a) is preferably constituted by mono- or oligosaccharide groups or hydroxyalkyl, carboxyalkyl, aminoalkyl, alkyl, acyl or hydroxyalkyl(alkyloxy)alkyl.

Component b) in the composition of the present invention is preferably a substituted $\beta$-1,4-linked glucan, glucomannan, xylan, mannan or a $\beta$1,4-linked polysaccharide consisting of 2-acetamido-2-deoxy-D-glucopyranos-or 2-amino-2-deoxy-D-glucopyranos entities, or agar or carrageenan. The substitution of the glycan of component b) may be the same as that of component a).

In a preferred embodiment of the composition of this invention component b) is a substituted $\beta$-1,4-linked glucan, glucomannan, xylan, mannan or a $\beta$1,4-linked polysaccharide consisting of 2-acetamido-2-deoxy-D-glucopyranos or 2-amino-2-deoxy-D-glucopyranos entities, or agar or carrageenan. The substitution consisting of mono- or oligosaccharide groups or hydroxyalkyl, carboxyalkyl, aminoalkyl, alkyl, acyl or hydroxyalkyl(alkyloxy)alkyl.

According to yet another embodiment of the invention component a) is a substituted $\beta$-1,4-linked glucan or mannan, chitin or chitosan, component b) also being a polysaccharide selected from these or from agar and carrageenan. In such composition the substitution is preferably mono- or oligosaccharide groups, hydroxyalkyl, carboxyalkyl, alkyl, acyl or hydroxymethyl(methyloxy)methyl.

According to a particularly preferred embodiment of the invention components a) and b) are selected from galactomannans, cellulose derivatives, chitin derivatives and chitosan derivatives. In such composition components a) and b) are suitably selected from galactomannans, hydroxyethyl cellulose and carboxymethyl celluloses. Components a) and b) are particularly selected from galactomannans, such as Guar gums and Locust bean gums.

In regard to the character of components a) and b) as concerns their dissolvability in water of a certain temperature, such temperature is not critical as to its level but constitutes a demarcation line between the two components in regard to dissolvability in water. However, for normal uses of the composition of the present invention at normal environmental temperatures, a practical temperature range would be from abut 30° C. to about 50° C. although still not a limiting range. At normal room temperature a practical demarcation temperature would be about 40° C.

It is important to note that the composition of the invention when practically utilized is arranged in the form of a solid film, wherein the polysaccharides are present in an essentially amorphous state.

The invention also covers within its scope a body in solid phase having a surface intended for contact with a liquid and for relative movement between surface and liquid. Such surface is coated with a solid film essentially consisting of a composition in accordance with the present invention.

The expression "a body in solid phase" as used herein is to be broadly interpreted to define definite shape and volume, but it should not be construed to exclude bodies which are hollowed out. Thus, the term "solid" merely defines a physical state as being neither liquid, nor gaseous.

According to another aspect of the invention such coated surface facing the film is provided with regularly or randomly distributed grooves or ribs aligned in the flow direction of the relative movement between body and liquid.

According to another embodiment of the invention said film exposed to the liquid is provided with regularly or randomly distributed grooves or ribs aligned in the flow direction of said relative movement.

A primer may be placed between the surface and the film, and in those cases where the surface is constituted by a plastic the primer preferably comprises an albumin material.

Such body in solid phase is preferably constituted by a watercraft.

While applying the techniques of the present invention for reducing friction or drag in a system where a body in solid phase moves through a surrounding liquid, mostly water, the polysaccharides contained in the film applied on to the body in question are released to the viscous boundary layer by dissolution in combination with diffusion from the film. The dissolved polysaccharides are primarily dissolved from the film and then diffused through the adhering viscous boundary layer out into the mobile aqueous phase. Since, however, the diffusion rate of the polysaccharides through the liquid is slow a relative high concentration thereof can be maintained in a viscous boundary layer thereby providing thereat a friction- or drag-reducing effect.

In regard to this particular aspect of the invention it will be further described in the following mainly in connection with application on watercraft, i.e. solid bodies in contact with water, but it should be observed that the applicability of the invention is in no way limited thereto. Thus, it is conceivable to use the invention in all applications where a solid body moves relative to a liquid, and the invention is thus as concerns this application aspect thereof limited only to the extent defined by the appended patent claims.

In regard to the proportions between components a) and b) of the polysaccharide-based composition of the invention, this proportion is not critical as long as there are at least one component of each of the types a) and b) present in the composition. However, although the proportional ratio between same is not critical it is preferred that it lies within the range about 1:99 to 99:1, preferably from about 1:10 to about 10:1.

In regard to the grooves or ribs that may be combined with the application of a film of a composition according to the invention these may in cross-section be of any shape, although from manufacturing reasons it is preferred that they in cross-section have an essentially triangular shape. In regard to the dimensions of such ribs or grooves quite generally both spacing and height lie within the range of about 25 to about 250 microns. This dimensional range applies generally to water as a liquid. At lower speeds, say 1 to 3 meters per second, spacing and highest are selected from the upper part of this range, whereas at higher speeds, i.e. greater than about 3 meters per second, the lower range is preferred. In relation to liquids of higher viscosity than water the dimensional range of said ribs or grooves can extend up to about 1,000 microns.

As indicated earlier such ribs or grooves may be arranged in the uncoated body before applying a solid film of the composition of the invention, but it is also possible to arrange for ribs or grooves on the exposed side of the film.

As also indicted earlier in this disclosure the composition described can be used in other technical areas than as a means for reducing friction. Thus, the composition can be used as a means for facilitating removal of undesired contamination from surfaces, such as graffiti, scrawl, soot, traffic contamination etc. This is an highly interesting use of the composition described herein and it has been found to greatly reduce or even eliminate the problem of the removal of contamination from surfaces in public places, such as from underground cavities, trains, building facades etc.

In regard to this particular aspect of the invention there is provided a method for the removal of such undesired contamination on a surface. Such method includes the steps:

a) spraying a solution of a composition on to said surface before it is subjected to contamination,
b) allowing the applied solution to dry to form a solid film,
c) wetting the coated surface, after contamination thereof, with a liquid, and
d) removing the undesired contamination by spraying, brushing, gentle rubbing or the like of the said surface with a liquid. The solution used for the cleaning procedure is preferably an aqueous one and likewise an aqueous liquid is preferably used for the wetting and cleaning steps.

Other conceivable uses for the composition of the present invention are i.a. use as a means for preserving moisture, use as a protective surface coverage, use as a packaging material and use as a slow release matrix or coating for drugs.

The polysaccharides used in the composition of the invention may be of a synthetic or natural character. Particularly preferred polysaccharides are those originating from the plant kingdom.

Among such polysaccharides there may be mentioned saccharides derived from plant materials, such as celluloses, pectines, and starch. Certain polysaccharides may be used in a more or less native form, whereas others, such as cellulose, may be used in more or less far-reaching substitutions for reaching suitability properties. Another type of plant polysaccharides are so called "gums" that may be constituted by algyl constituents, carrageenans or extracts from plant seeds, such as Guar gum and Locust bean gum which is an extract of beads from *Ceratonia silique*.

The film of polysaccharides can be applied to the body in any manner, for example by application of a liquid composition containing the polysaccharide. The film formation can then take place after the application by for example drying, precipitation, polymerization or the like. It is also conceivable to apply to the solid body the film in a pre-fabricated form, the film being attached by gluing or the like.

When the film is formed in situ on the body it is suitable to apply to the body in advance a suitable primer. Such primer can contain matrix-bound particles having affinity to the polymer, and as examples of materials there may be mentioned activated carbon and albumin materials.

In regard to the practical use of the invention illustrating exemplification of varying uses will be made in the following. In regard to the use of the invention as a drag-reducing means reference is made to the appended drawings, wherein:

in the following specific examples the different solutions of polysaccharides were prepared in the following manner.

The respective polysaccharides in the form of dry powders are separately transferred to cold water ($\leq$ about 20° C.) under intense stirring and are dispersed to a fine suspension for about 10 minutes. The respective mixtures are then heated to abut 40° C. (component a)) and about 90° C. (component b)), respectively, for a period of time of 30–45 minutes to obtain dissolution. The solutions are then allowed to cool down to room temperature under continued stirring and are then mixed to form the desired polysaccharide-based composition ready for use.

In the examples below mixtures of two gums were used. The gums were Locust bean gum sold by Sigma Chemical Corporation, St. Louis, USA. This gum is a galactomannan polysaccharide originating from seeds from *Ceratonia siliqua*. The other gum used was Guar gum from the same company.

The mixture used are designated in the example as "Composition" followed by a figure, where for example 20 means that 20% by weight of Guar gum and 80% by weight of Locust bean gum are contained in the mixture. The figure 30 means that 30% by weight of Guar gum are used in the mixture, the rest being Locust bean gum.

EXAMPLE 1

A sailboat hull of the boat type R-8 (1935) was used in the experiments. The data of this type of boat are waterline length 9.30 m, displacement 8.5 tons and a wetted surface of about 20 m². The wetted area of the hull was initially coated with a primer consisting of carbon powder in the form of activated carbon having a particle size of 20–50 microns and in a quantity of about 10% by weight in an epoxy base. After drying the coated surface was carefully polished with fine sandpaper (No. 180) until an even and non-glossy surface was obtained. The surface was washed with water for the removal of polishing particles.

For applying the technique of the present invention an aqueous solution was prepared containing 1% by weight of Composition 30. The surface prepared in advance with primer (activated carbon suspended in an epoxy paint, about 10% w/w) was then sprayed twelve times with this aqueous solution with drying between each coating operation for about 1 hour. In total the surface was coated with 12 l of aqueous solution. After concluded coating the surface was then allowed to dry at 20° C. for 30 hours, and the boat was then launched.

For carrying out traction tests the boat was towed using a motor-driven towboat in a protected harbor area while using a 25 m towline. The traction force in the towing was measured with a tensile tester coupled to an electronic recorder. Speed, wind velocity and wind direction were measured using modern electronic equipment (Danasystem 7000). Each measurement was repeated twice with 180° change of towing direction.

Figure 1:
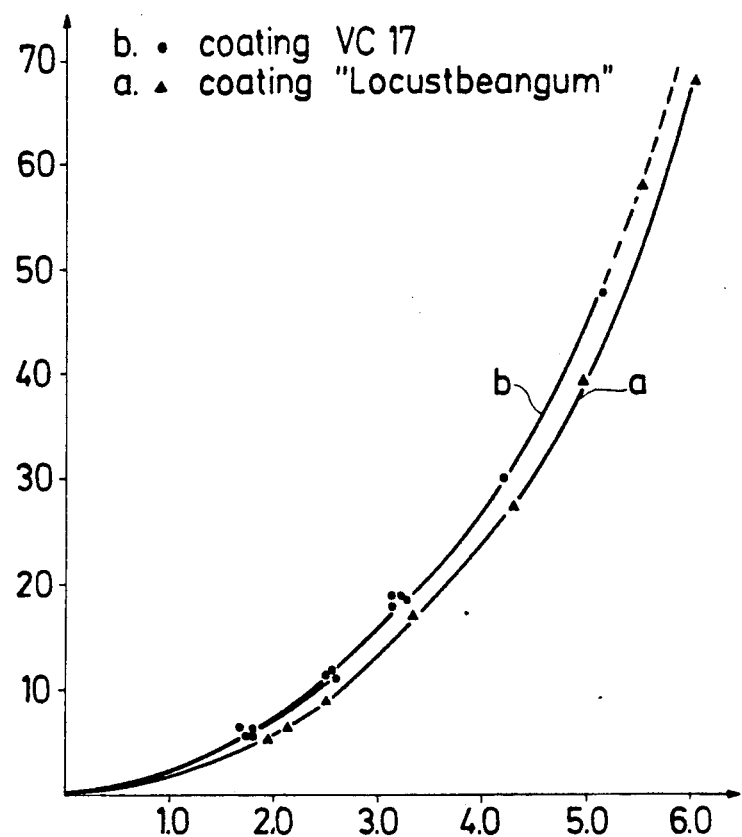
FIG. 1 shows a diagram, wherein the traction force has been plotted as a function of speed.

The results obtained in these traction tests are shown on the appended FIG. 1, wherein the traction force in kp at the vertical axis has been plotted as function of speed in knots on the horizontal axis. The experimental results using the technique according to the invention is clear from curve a. The traction tests were repeated after 24 hours, essentially the same results being obtained.

The boat was then lifted ashore and a polysaccharide coating was removed using a squirter and by scrubbing. The hull of the boat was then coated with a conventional Teflon-based hullpaint (VC17) and traction tests were performed again in the same manner as presented above. The results from these traction experiments are also presented in the appended FIG. 1, by curve b.

As is clear from the displacement between the two curves there will be obtained by using the technique of this invention a substantial reduction of the drag due to reduced friction between boat hull and surrounding water. The difference is obvious and statistically significant.

EXAMPLES 2-4

Figure 2:
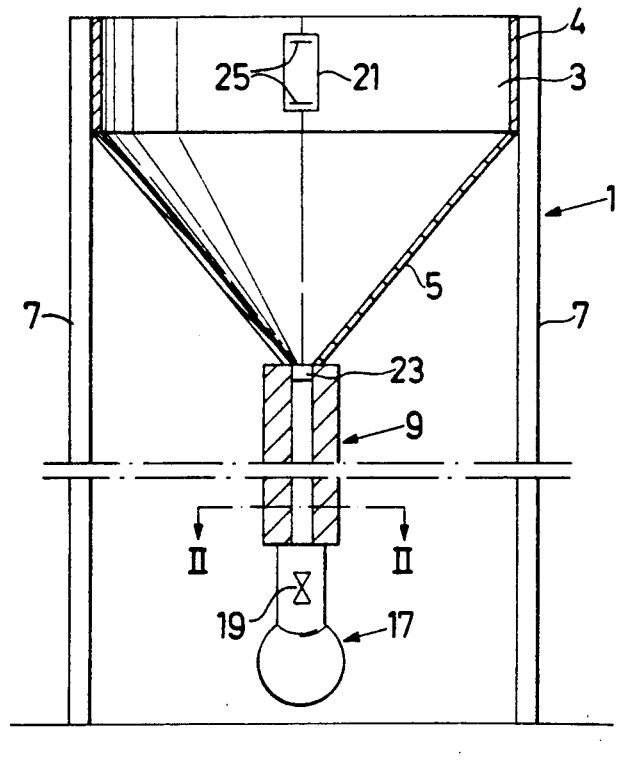
FIG. 2 is a vertical cross-section diagrammatically illustrating the test rig used in the experiments.
Figure 3:
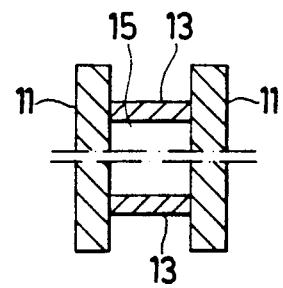
FIG. 3 is an enlarged section along line II—II in FIG. 2.

The experiments presented under these examples were performed using the friction test rig shown in FIGS. 2 and 3. The friction test rig generally designated 1 comprises a header tank or funnel 3 having an upper cylindrical part 4 and a lower conical part 5.

The conical part 5 is at its lower end attached to a flow section 9, which is built up from test plates 11 of brass and side plates 13 to form a flow passage 15. The rig is furthermore provided with an outlet 16,17 containing a control valve 19 for controlling liquid flow through passage 15.

All the elements described are supported by four support legs 7 standing on the ground, a platform or the like. Viewing windows 21,23 are provided in the upper part of funnel 3 and the upper part of flow section 9, respectively. These viewing windows have for their purpose to enable checking liquid levels in the test rig.

The friction test rig as described above is designed so that the turbulent friction qualities of various surface coatings can be conveniently assessed. The experimental results presented below demonstrate the fact that the test rig used gives reproducible results with water as at est fluid with and without approximately 10 ppm of Polyox added to the water, the brass surfaces of test plates 11 being untreated. When Polyox is added to the water a marked increase of flow speed occurs. The test rig described functions briefly as follows.

The apparatus is filled with the outlet valve 19 closed. The pressure tappings are connected to manometer tubes (not shown) and water sucked through to remove air bubbles. The flow is then started by a partial or complete opening of valve 19, and when the level passes the upper of the two marks 25 in the viewing upper window 21 a stopwatch is started. Marks 25 are 100 mm apart and when the level is approximately half way between them the manometer levels are read. The stopwatch is stopped when the level in the header tank passes the lower mark.

Results obtained

According to H. Schlichting, "Boundary Layer Theory", p. 576, McGraw Hill Book Company, New York, 1968, the pressure drop for turbulent flow through a given length of rectangular duct obeys the relation:

$$\delta p = K \frac{L}{d_h} \cdot \frac{1}{2} \rho U^2 \cdot R^{\frac{1}{4}}$$

where
U is mean flow speed
$\rho$ is fluid density
L is duct strength
$d_h$ is hydraulic diameter, defined as 4 times cross section area/wetted perimeter
R is Reynolds number $Ud_h/\gamma$, where
$\gamma$ is kinematic viscosity
and
K is a constant.

Kinematic viscosity depends somewhat on temperature, but for a narrow range of temperatures this effect is negligible. For a 20 mm ×5 mm duct $d_h=8$ mm, whilst if the height h of the duct were reduced from 5 to 4 mm, $d_h$ would become $6^{2/3}$ mm. Thus the ratio of the $d_h$ values would be 0.833, quite close to the ratio 0.8 of the h values. The value of the constant K should change only slightly for changes in h of this order. The mean speed U is proportional to $1/t_h$, where t is the time for given quantity of fluid to flow through the duct. Thus to a good approximation $$\delta p \propto \frac{U^{7/4}}{d_h^{5/4}} \propto \frac{1}{t^{7/4} h^3}$$

or $$a = \frac{t}{1000} \left[ \frac{h}{hs} \right]^{12/7} \delta p^{4/7} = \text{constant}$$

where hs is the "standard" value of h as used in the proving experiments. The results obtained bear this exception quite accurately, as can be seen from the following table.

| Flow time t secs. | δp mm water | a | b |
|---|---|---|---|
| 101.3 | 965 | 5.14 | −.02 |

-continued

| Flow time t secs. | δp mm water | a | b |
|---|---|---|---|
| 100.5 | 978 | 5.14 | −.02 |
| 100.2 | 1001 | 5.19 | −.03 |
| 98.8 | 1029 | 5.20 | −.04 |
| 109.5 | 843 | 5.14 | −.02 |
| 113.2 | 803 | 5.17 | −.01 |
| 110.0 | 841 | 5.16 | 0 |
| 107.4 | 846 | 5.06A | |
| 111.2 | 833 | 5.19 | −.03 |
| 114.0 | 790 | 5.16 | 0 |
| 138.6 | 511 | 4.89B | |
| 110.7 | 831 | 5.16 | 0 |
| 116.2 | 767 | 5.17 | −.01 |
| 110.7 | 828 | 5.15 | −.01 |
| 223.2 | 236 | 5.07C | |
| 114.5 | 790 | 5.18 | −.02 |
| 109.7 | 856 | 5.20 | −.04 |
| 108.3 | 848 | 5.11 | −.05 |
| 109.0 | 843 | 5.12 | −.03 |
| 108.9 | 836 | 5.09 | −.07 |
| 109.6 | 836 | 5.12 | −.04 |

Clearly errors are possible due to inaccurate manometer readings which, since they change a little with time, must be taken at the appropriate half way time in each case. Such an error may account for the low value of a at A. Also the $R - \frac{1}{4}$ law is probably not quite exact, so the somewhat lower values of a at B and C (where the value was more closed than in the other cases making the flow times correspondingly much longer), may in part be due to this. The mean of the rest of the values of a is 5.16 and the final column b of the table shows the differences from this value, which in all cases except one lie within 1% of the mean.

When approximately 10 ppm of Polyox was added to the Header tank water very different values of a were obtained, as follows:

| t | δp | a |
|---|---|---|
| 104.5 | 757 | 4.62 |
| 100.2 | 777 | 4.49 |

Thus the apparatus is clearly able to demonstrate a large friction reduction effect with such concentration of Polyox.

It should be noted that a flow time of 100 secs represents a flow speed through the duct of 2.5 m/s, similar to the speeds at which the $\frac{1}{3}$ scale 12 m yacht models are run, with similar values of turbulent skin friction stress.

In the following examples the test rig described above has been used, the inside of brass plates 11 facing flow passage 15 being covered with the gum mixtures used in the experiments. It is to be noted that the coating thickness of the applied mixtures is not significant for the reduction of the friction as long as it lasts through the whole experiment. However, the approximate thickness of a layer swollen by contact with water is of the order of a friction of a millimeter, but it must be noted that the thickness per se is insignificant, as long as the coating covers the surface contacting the liquid phase. (All percentages refer to weight.)

EXAMPLE 2

Test plates, Composition 20

Test plates 11 were coated with 9 layers of 0.5% Composition 20 with paint brush. After each 3 layers of coat the plates were sanded (500/1200 paper).

The plates were allowed contact with water ~10 min before Series 1 of experiments.

| Series 1 (15–35 min) | | |
|---|---|---|
| Flow time (s) | Sp (mm H$_2$O) | a |
| 157.5 | 430 | 5.03 |
| 114.2 | 760 | 5.06 |
| 138.1 | 550 | 5.08 |
| 184.0 | 320 | 4.97 |

Average for a=5.035.
Average for volume measurements 92.5 ml (92.0, 93.0, 92.5).
Standard volume 92.0 ml gives a=5.16 for plain brass.
Corrected value for a=5.08.
Drag reduction (5.08/5.16)$^2$=0.969 3.1%.

| Series 2 (2 hrs–21.5 hrs) | | |
|---|---|---|
| Flow time (s) | Sp (mm H$_2$O) | a |
| 144.8 | 505 | 5.07 |
| 117.2 | 720 | 5.03 |
| 109.0 | 830 | 5.07 |
| 183.9 | 325 | 5.01 |

Average for a=5.045.
Average for volume=92.5 ml
Corrected value for a=5.09.
Drag reduction (5.09/5.16)$^2$=0.973 2.7%.

| Series 3 (20 hrs–20.30 hrs) | | |
|---|---|---|
| Flow time (s) | Sp (mm H$_2$O) | a |
| 115.5 | 775 | 5.17 |
| 144.6 | 515 | 5.12 |
| 140.4 | 540 | 5.11 |
| 153.0 | 465 | 5.11 |
| 106.0 | 885 | 5.12 |

Average for a=5.126.
Average for volume=92.75 ml.
Corrected value for a=5.19.
Drag reduction (5.19/5.16)$^2$=1.0011% −1.1%.

| Series 4 (30 hrs–30.15 hrs) | | |
|---|---|---|
| Flow time (s) | Sp (mm H$_2$O) | a |
| 111.0 | 820 | 5.13 |
| 135.1 | 575 | 5.10 |
| 175.3 | 365 | 5.10 |
| 114.0 | 760 | 5.04 |
| 121.5 | 685 | 5.07 |

Average for a=5.088.
Average for volume=92.75 ml.
Corrected value for a=5.16.
Drag reduction (5.16/5.16)$^2$=1 0%.

Conclusion

The test surface showed a drag reduction of ~3%. The surface was eliminated after 20 hrs and measurements at 20 hrs and 30 hrs showed normal values for uncoated surface. The plates were removed at 30 hrs and inspection showed absence of coating.

EXAMPLE 3

Test plates, Composition 30

Test plates 11 were coated with 9 layers of 0.5% Composition 30 with paint brush. After each 3 layers of coat the plates were sanded (500/1200 paper).

The plates were allowed contact with water ~10 min before Series 1 experiments.

| Series 1 (15–40 min) | | |
|---|---|---|
| Flow time (s) | Sp (mm H$_2$O) | a |
| 165.0 | 395 | 5.02 |
| 147.4 | 490 | 5.08 |
| 117.8 | 735 | 5.11 |
| 146.7 | 491 | 5.06 |
| 192.3 | 310 | 5.10 |

Average for a=5.074.
Average volume=92.0 ml.
Corrected value for a=5.07.
Drag reduction=3.5%.

| Series 2 (1.30–1.45 hrs) | | |
|---|---|---|
| Flow time (s) | Sp (mm H$_2$O) | a |
| 182.8 | 335 | 5.07 |
| 127.2 | 640 | 5.10 |
| 112.1 | 805 | 5.13 |
| 122.1 | 690 | 5.12 |

Average for a=5.105.
Average volume=91.25 ml
Corrected value for a=5.03.
Drag reduction=5.0%.

| Series 3 (2.30–2.45 hrs) | | |
|---|---|---|
| Flow time (s) | Sp (mm H$_2$O) | a |
| 121.0 | 705 | 5.13 |
| 148.0 | 495 | 5.08 |
| 147.7 | 490 | 5.08 |
| 136.8 | 570 | 5.13 |

Average for a=5.105.
Average volume=91.25 ml.
Corrected value for a=5.03.
Drag reduction=5.0%.

| Series 4 (7–7.15 hrs) | | |
|---|---|---|
| Flow time (s) | Sp (mm H$_2$O) | a |
| 178.2 | 350 | 5.07 |
| 137.4 | 570 | 5.16 |
| 110.9 | 815 | 5.11 |
| 138.0 | 565 | 5.10 |

Average for a=5.095.
Average volume=91.25 ml.
Corrected value for a=5.02.
Drag reduction=5.2%.

| Series 5 (10–10.30 hrs) | | |
|---|---|---|
| Flow time (s) | Sp (mm H$_2$O) | a |
| 164.8 | 405 | 5.09 |
| 115.8 | 770 | 5.17 |
| 177.1 | 365 | 5.16 |

-continued

Series 5 (10-10.30 hrs)

| Flow time (s) | Sp (mm H$_2$O) | a |
|---|---|---|
| 144.0 | 530 | 5.13 |

Average for a=5.1375.
Average volume=91.0.
Corrected value for a=5.04.
Drag reduction=4.6%.

Series 6 (After 3 days)

| Flow time (s) | Sp (mm H$_2$O) | a |
|---|---|---|
| 145.0 | 500 | 5.05 |
| 122.1 | 665 | 5.00 |
| 111.9 | 780 | 5.03 |
| 174.8 | 355 | 4.98 |

Average for a=5.02.
Average volume=93.5 (93, 94, 93.5, 93.5, 93, 94, 93).
Corrected value for a=5.16.
Drag reduction (5.16/5.16)$^2$=1.00 0%.

EXAMPLE 4

Test plates, Composition 30

Test plates 11 were coated with 0.5% Composition 30 (20 layers with sanding (500/1200) in between every 3 layers). The plates were allowed contact with water for ~10 min before Series 1 of experiments.

Series 1 (15–40 min)

| Flow time (s) | Sp (mm H$_2$O) | a |
|---|---|---|
| 161.2 | 415 | 5.05 |
| 135.0 | 550 | 4.97 |
| 127.0 | 635 | 5.07 |
| 149.2 | 460 | 4.95 |
| 119.5 | 695 | 5.02 |
| 173.0 | 350 | 4.92 |

Average for a=4.996.
Average for volume=92.5.
Corrected value for a=5.04.
Drag reduction (5.04/5.16)$^2$=0.954 4.6%.

Series 2 (1 hr–1.20 hrs)

| Flow time (s) | Sp (mm H$_2$O) | a |
|---|---|---|
| 149.8 | 465 | 5.00 |
| 109.7 | 800 | 5.00 |
| 112.8 | 760 | 4.99 |
| 133.5 | 585 | 5.08 |
| 137.5 | 545 | 5.03 |
| 114.2 | 750 | 5.04 |

Average for a=5.02.
Average for volume=92.0.
Corrected value for a=5.02.
Drag reduction (5.02/5.16)$^2$=0.946 5.4%.

Series 3 (4 hrs–4.20 hrs)

| Flow time (s) | Sp (mm H$_2$O) | a |
|---|---|---|
| 148.0 | 470 | 4.98 |
| 161.5 | 410 | 5.02 |
| 105.4 | 860 | 5.03 |

Average for a=5.01.

Average for volume=92.0.
Corrected value for a=5.01.
Drag reduction (5.01/5.16)$^2$=0.942 5.8%.

Series 4 (10 hrs–10.30 hrs)

| Flow time (s) | Sp (mm H$_2$O) | a |
|---|---|---|
| 145.0 | 510 | 5.11 |
| 118.0 | 725 | 5.09 |
| 158.9 | 420 | 5.02 |
| 107.6 | 855 | 5.10 |
| 169.3 | 380 | 5.05 |

Average for a=5.07.
Average for volume=92.0.
Corrected value for a=5.07.
Drag reduction (5.07/5.16)$^2$=0.965 3.5%.

Series 5 (24 hrs–24.20 hrs)

| Flow time (s) | Sp (mm H$_2$O) | a |
|---|---|---|
| 128.0 | 625 | 5.07 |
| 126.1 | 650 | 5.10 |
| 111.0 | 810 | 5.10 |
| 184.5 | 320 | 4.98* |

Average for a=5.09 (* omitted).
Average volume=92.0.
Corrected value for a=5.09.
Drag reduction (5.09/5.16)$^2$=0.973 2.7%.

Series 6 (26 hrs–27 hrs)

| Flow time (s) | Sp (mm H$_2$O) | a |
|---|---|---|
| 134.1 | 580 | 5.08 |
| 119.0 | 730 | 5.15 |
| 126.9 | 650 | 5.14 |
| 176.1 | 370 | 5.16 |
| 127.0 | 650 | 5.14 |
| 119.0 | 725 | 5.13 |

Average for a=5.133.
Average for volume=92.0.
Corrected value for a=5.133.
Drag reduction=1.1%.

EXAMPLE 5

Tests were conducted at British Maritime Technology in the U.K. using their No. 3 towing tank. A model yacht of approximately 6.4 m long was used to assess its hydrodynamic resistance in the water with four different surface finishes on the hull—smooth painted surface, composition-coated surface, riblet-film surface and composition-coated table surface.

The composition used in these experiments was the same as that used in Example 1 above.

Figure 4:
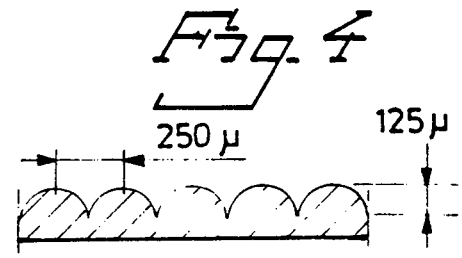
FIG. 4 shows a partial cross-section of the surface profile of a film applied to the hull of a boat model.

The resistance was measured using a dynamometer attached to the yacht as it was being towed through the calm water of the tank. The tests were carried out at five different towing speeds ranging from 1.00 m/s to 2.38 m/s. The riblet film had a semicircular cross section with a height and rib spacing of about 125 μm and about 250 μm, respectively. FIG. 4 shows a cross-section through such profiled film.

Results of the tests are given in Table 1 below in terms of the resistance coefficient C, which is linearly proportional to the hydrodynamic resistance at a given speed, percentage reduction compared with that of smooth painted surface is also given for each surface finish.

TABLE 1

Resistance coefficient ($C \times 10^3$ value) and percentage reduction in hydrodynamic resistance by using different hull-surface finishes

| Speed (m/s) | Surface finish | | | |
|---|---|---|---|---|
| | Smooth painted | Composition Coated | Riblet Film | Composition on Riblet Film |
| 1.00 | 4.56 | 4.44 (3.1%) | 4.50 (1.8%) | 4.42 (3.5%) |
| 1.50 | 4.51 | 4.38 (2.8%) | 4.38 (2.8%) | 4.36 (3.3%) |
| 2.38 | 6.20 | 6.11 (1.5%) | 5.98 (3.5%) | 5.92 (4.5%) |

As can be seen from the table a significant reduction of the resistance coefficient is obtained both by using the composition of the invention and riblets, and that the combination of the two gives an even better reduction of resistance. It can also be seen from the table that whereas a film of the composition of the invention has an effect which is reduced at increasing speed the riblets result in improved reduction of resistance at increasing speed.

EXAMPLE 6

This example illustrates the use of the invention as a means for facilitating removal of undesired contamination on a surface. In the example there is used a polysaccharide solution containing about 2% by weight of Composition 30 as defend earlier in this disclosure. This solution is applied onto a smooth painted surface in several layers in a quantity of about 1 l per m². The applied material is allowed to dry to a transparent film.

To imitate for example the graffiti problem the coated surface is subjected to scrawl using both a waterproof felt pen and a spray lacquer paint. After the scrawl has dried the surface is cleaned using a sponge soaked in water. The contaminated surface is gently wiped using the sponge and the surface then becomes slippery and the contamination can be easily washed away. After drying the film is reconstituted and the procedure can be repeated several times with successful result in regard to the removal of the contamination. It goes without saying that this technique will highly facilitate the cleaning of contaminated surfaces since all materials used are non-toxic and since the removal procedure is quite simple to carry out using simple means of assistance.

EXAMPLE 7

This example is an illustration of the use of the inventive techniques for reducing friction in regard to plastic catheters for introduction into a living animal body, such as the urinary tract. An ordinary plastic catheter is used in the experiment and the surface thereof is introductorily matted using wet-and-dry sanding (No. 1200 sanding paper). The matted catheter is then dipped into a 1% by weight solution of Composition 30, the procedure being repeated four times with drying in between each dipping step.

Before use the treated catheter is soaked in water for one minute and is then easily inserted due to its slippery surface. Again, in this use, the advantage of using the technique of the invention resides in the fact that the coating applied is non-toxic and can be reformed several times.

EXAMPLE 8

This example illustrates the use of the invention for facilitating oral administration of tablets.

Large aspirin tablets were dipped in a 1% by weight solution of Composition 20 to produce a surface coating having a thickness of approximately 5–10 microns upon drying. When taken orally the tablets become slippery when wetted in the mouth thus greatly facilitating the swallowing of same. This coating technique can be generally used due to the non-toxicity of the composition used.

I claim:

1. A friction reducing polysaccharide-based coating composition comprising:
    at least a first component a) excluding galactans comprising a substituted $\beta$-1,4 -linked glycan which is dissolvable in water of a certain temperature and which has a weight average molecular weight (Mw) of $\geq 5 \cdot 10^4$ Daltons, and
    at least a second component b) also excluding galactans, comprising a substituted $\beta$-1,4 -linked glycan which is more difficult to dissolve than said first component at said temperature, or is agar
    wherein the ratio between said first component and said second component is in a range sufficient to provide friction reducing properties to said coating composition.

2. A composition according to claim 1, wherein component a) is a substituted $\beta$-1,4-linked glucan, glucomannan, xylan, mannan or a $\beta$1,4-linked polysaccharide consisting of 2-acetamido-2-deoxy-D-glucopyranos-or 2-amino-2-deoxy-D-glucopyranos entities.

3. A composition according to claim 1, wherein component b) is a substituted $\beta$-1,4-linked glucan, glucomannan, xylan, mannan or a $\beta$1,4-linked polysaccharide consisting of 2-acetamido-2-deoxy-D-glucopyranos-or 2-amino-2-deoxy-D-glucopyranos entities, or agar.

4. A composition according to claim 2, wherein component b) is a substituted $\beta$-1,4-linked glucan, glucomannan, xylan, mannan or a $\beta$1,4-linked polysaccharide consisting of 2-acetamido-2-deoxy-D-glucopyranos-or 2-amino-2-deoxy-D-glucopyranos entities.

5. A composition according to claim 1, wherein component a) is a $\beta$-1,4-linked glycan substituted with mono- or oligosaccharide groups or hydroxyalkyl, carboxyalkyl, aminoalkyl, alkyl, acyl or hydroxyalkyl(alkyloxy)alkyl.

6. A composition according to claim 5, wherein component b) is a substituted $\beta$-1,4-linked glucan, glucomannan, xylan, mannan or a $\beta$1,4-linked polysaccharide consisting of 2-acetamido-2-deoxy-D-glucopyranos-or 2-amino-2-deoxy-D-glucopyranos entities, or agar.

7. A composition according to claim 1, wherein component b) is a $\beta$-1,4-linked glycan substituted with mono- or oligosaccharide groups or hydroxyalkyl, carboxyalkyl, aminoalkyl, alkyl, acyl or hydroxyalkyl(alkyloxy)alkyl or agar.

8. A composition according to claim 2, wherein component b) is a $\beta$-1,4-linked glycan substituted with mono- or oligosaccharide groups or hydroxyalkyl, carboxyalkyl, aminoalkyl, alkyl, acyl or hydroxyalkyl(alkyloxy)alkyl, or agar.

9. A composition according to claim 5, wherein component b) is a $\beta$-1,4-linked glycan substituted with mono- or oligosaccharide groups or hydroxyalkyl, carboxyalkyl, aminoalkyl, alkyl, acyl or hydroxyalkyl(alkyloxy)alkyl, or agar.

10. A composition according to claim 2, wherein component b) is a substituted β-1,4-linked glycan which is more difficult to dissolve than said first component at said temperature, or is agar.

11. A composition according to claim 10, wherein component b) is a substituted β-1,4-linked glucan, glucomannan, xylan, mannan or a β1,4-linked polysaccharide consisting of 2-acetamido-2-deoxy-D-glucopyranos-or 2-amino-2-deoxy-D-glucopyranos entities or agar.

12. A composition according to claim 10, wherein component b) is a β-1,4-linked glycan substituted with mono- or oligosaccharide groups or hydroxyalkyl, carboxyalkyl, aminoalkyl, alkyl, acyl or hydroxyalkyl(alkyloxy)alkyl, or agar.

13. A composition according to claim 1, wherein component b) is a substituted β-1,4-linked glucan, glucomannan, xylan, mannan or a β1,4-linked polysaccharide consisting of 2-acetamido-2-deoxy-D-glucopyranos-or 2-amino-2-deoxy-D-glucopyranos entities, or agar, the substitution consisting of mono- or oligosaccharide groups or hydroxyalkyl, carboxyalkyl, aminoalkyl, alkyl, acyl or hydroxyalkyl(alkyloxy)alkyl.

14. A composition according to claim 2, wherein component b) is a substituted β-1,4-linked glucan, glucomannan, xylan, mannan or a β1,4-bound polysaccharide consisting of 2-acetamido-2-deoxy-D-glucopyranos-or 2-amino-2-deoxy-D-glucopyranos entities, or agar, the substitution consisting of mono- or oligosaccharide groups or hydroxyalkyl, carboxyalkyl, aminoalkyl, alkyl, acyl or hydroxyalkyl(alkyloxy)alkyl.

15. A composition according to claim 5, wherein component b) is a substituted β-1,4-linked glucan, glucomannan, xylan, mannan or a β1,4-bound polysaccharide consisting of 2-acetamido-2-deoxy-D-glucopyranos-or 2-amino-2-deoxy-D-glucopyranos entities, agar, the substitution consisting of mono- or oligosaccharide groups or hydroxyalkyl, carboxyalkyl, aminoalkyl, alkyl, acyl or hydroxyalkyl(alkyloxy)alkyl.

16. A composition according to claim 10, wherein component b) is a substituted β-1,4-linked glucan, glucomannan, xylan, mannan or a β1,4-linked polysaccharide consisting of 2-acetamido-2-deoxy-D-glucopyranos-or 2-amino-2-deoxy-D-glucopyranos entities, or agar, the substitution consisting of mono- or oligosaccharide groups or hydroxyalkyl, carboxyalkyl, aminoalkyl, alkyl, acyl or hydroxyalkyl(alkyloxy)alkyl.

17. A composition according to claim 1, wherein component a) is a substituted β-1,4-linked glucan or mannan, chitin or chitosan, and wherein component b) also is a polysaccharide selected from these or from agar.

18. A composition according to claim 17, wherein the substitution is mono- or oligosaccharide groups, hydroxyalkyl, carboxyalkyl, aminoalkyl, alkyl, acyl or hydroxymethyl(methyloxy)methyl.

19. A composition according to claim 1, wherein components a) and b) are selected from galactomannans, cellulose derivatives, chitin derivatives and chitosan derivatives.

20. A composition according to claim 19, wherein components a) and b) are selected from galactomannans, hydroxyethyl celluloses and carboxymethyl celluloses.

21. A composition according to claim 19, wherein components a) and b) are selected from galactomannans.

22. A composition according to claim 21, wherein components a) and b) are selected from Guar gums and Locust bean gums.

23. The use of the composition according to claim 1 as a means for reducing friction.

24. A composition according to claim 1 in the form of a solid film.

25. A body in solid phase having a surface intended for contact with a liquid and for relative movement between surface and liquid, said surface being coated with a solid film essentially consisting of a composition according to claim 1.

26. A body according to claim 25, wherein said coated surfaces facing said film is provided with regularly or randomly distributed grooves aligned in the flow direction of said relative movement.

27. A body according to claim 25, wherein said film exposed to the liquid is provided with regularity or randomly distributed grooves aligned in the flow direction of said relative movement.

28. A body according to claim 25, wherein a primer is placed between said surface and said film.

29. A body according to claim 28, wherein the surface is formed from a plastic and the primer comprises an albumin material.

30. A body according to claim 25 which is constituted by a water craft.

31. The composition according to claim 1, wherein the ratio of said first component to said second component is in the range of about 1:10 to about 10:1.

32. The composition according to claim 1, wherein the said first component comprises a substituted β-1,4-linked glycan having a weight average molecular weight of $\geq 10^5$ Daltons.

33. The composition according to claim 32, wherein said first component comprises a substituted β-1,4-linked glycan having a weight average molecular weight of $\geq 10^6$ Daltons.

34. A method for reducing friction, said method comprising applying to a body a composition comprising
at least a first component a) excluding galactans comprising a substituted β-1,4 -linked glycan which is dissolvable in water of a certain temperature and which has a weight average molecular weight (Mw) of $\geq 5\cdot 10^4$ Daltons, and
at least a second component b) also excluding galactans, comprising a substituted β-1,4 -linked glycan which is more difficult to dissolve than said first component at said temperature, or is agar or a carrageenan,
wherein the ratio between said first component and said second component is in a range sufficient to provide friction reducing properties to said coating composition.

35. A method for increasing relative movement between a solid phase and a liquid, said method comprising applying to a solid phase a composition comprising
at least a first component a) excluding galactans comprising a substituted β-1,4 -linked glycan which is dissolvable in water of a certain temperature and which has a weight average molecular weight (Mw) of $\geq 5\cdot 10^4$ Daltons, and
at least a second component b) also excluding galactans, comprising a substituted β-1,4 -linked glycan which is more difficult to dissolve than said first component at said temperature, or is agar or a carrageenan,
wherein the ratio between said first component and said second component is in a range sufficient to improve relative movement between the solid phase and the liquid.

* * * * *